(No Model.)
T. O'CONNELL.
SHORE PROTECTOR.
No. 384,173. Patented June 5, 1888.
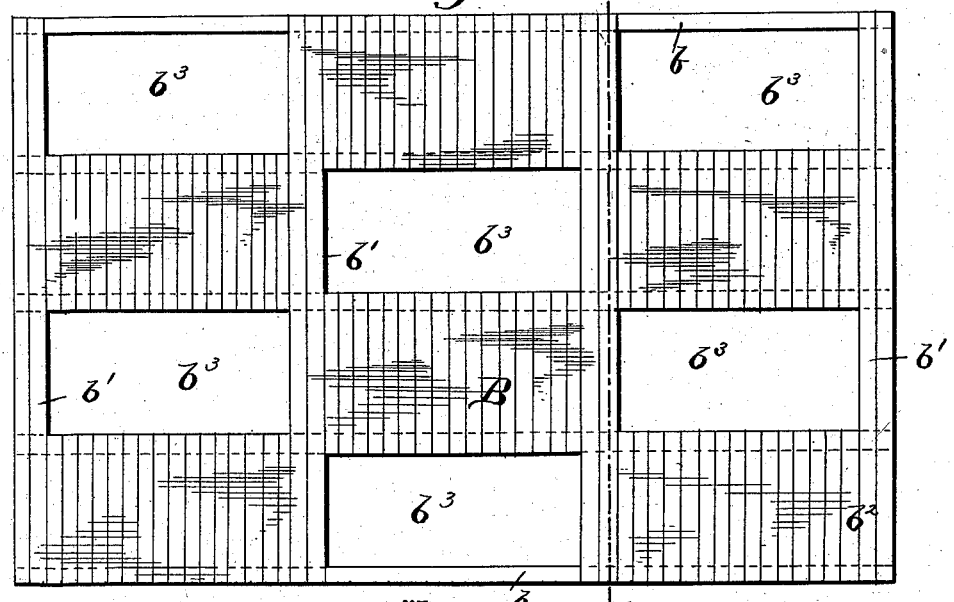
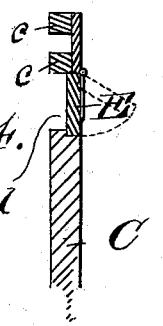
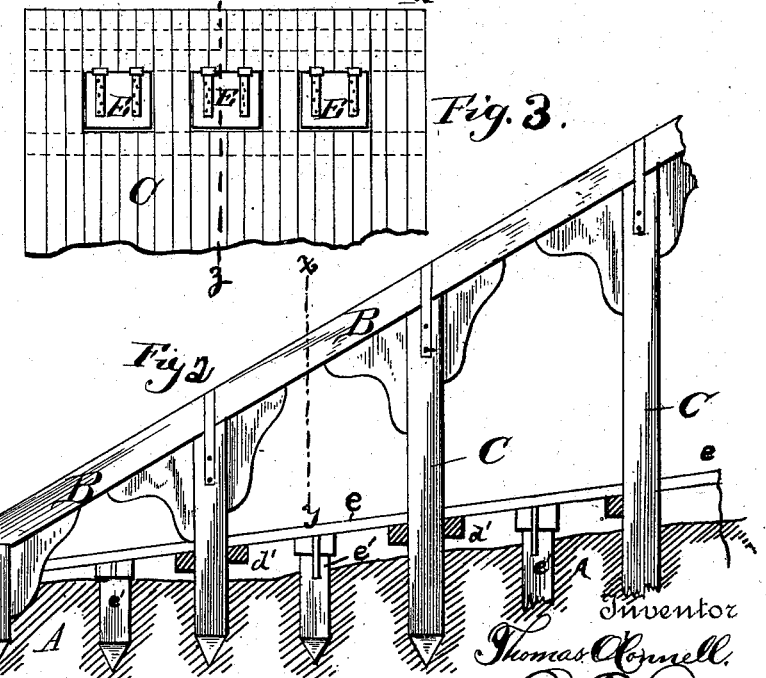

UNITED STATES PATENT OFFICE.

THOMAS O'CONNELL, OF BROOKLYN, NEW YORK.

SHORE-PROTECTOR.

SPECIFICATION forming part of Letters Patent No. 384,173, dated June 5, 1888.

Application filed February 7, 1888. Serial No. 263,231. (No model.)

*To all whom it may concern:*

Be it known that I, THOMAS O'CONNELL, of Brooklyn, in the county of Kings and State of New York, have invented certain new and useful Improvements in Shore-Protectors; and I do hereby declare that the following is a full, clear, and exact description of the invention, which will enable others skilled in the art to which it appertains to make and use the same, reference being had to the accompanying drawings, and to the letters of reference marked thereon, which form part of this specification.

My invention relates to an improvement in breakwaters, or, more especially, to an improvement in shore-protectors.

Heretofore shore-protectors have been constructed of various forms and adapted to be used in various ways to protect shores of particular formations; but these old devices have never fully accomplished the objects desired nor operated to entire satisfaction, as the water in time gradually undermines their foundations, or they are so constructed that the force of the water beating against them soon dashes the structures in pieces.

The object of my invention is to provide an effective shore-protector which will overcome the defective features of the protectors heretofore in use, and will prevent the shore, wherever desired, from being washed out, and it is especially adapted for use at seaside resorts, or where buildings are located near the water-line, as it is often the case that the ocean or other body of water, during the winter or stormy season of the year, will beat with great force upon the shore and gradually, or sometimes during a single storm, wash away a large area and do great damage in destroying any buildings that may be near the water-line, besides destroying the beach, particularly if it be of a sandy formation and adapted for bathing purposes. In such cases the shore-protector herein set forth would be of great service, as all the damage and loss would have been avoided. At bathing resorts the protector can be so placed that it will not interfere with the portion of the beach used by the bathers, but yet will prevent the beach from being washed out or injured from the force of the waves.

A further object is to provide an improved shore-protector which shall be extremely cheap in first cost, effective in use, and shall be so constructed that the force of the water will be exerted and expended upon an inclined breast-board, instead of striking directly upon the beach or shore, and the breast-board is provided with pockets through which the water can pour, preferably, upon planking placed near the surface of the ground after its force has been exerted upon the breast-board, the breast-board being supported by a series of piles provided with openings that are closed by hinged doors in such a manner that the water, after passing through the pockets in the breast-board, can flow through the openings in the piles back to the main body of water, but the doors will close the openings against the water when exerting pressure in the opposite direction.

With these ends in view my invention consists in certain novel features of construction and combinations of parts, more fully described hereinafter, and particularly pointed out in the claims.

Referring to the accompanying drawings, Figure 1 represents a top plan view of a portion of my device; Fig. 2, a vertical section or side elevation on line $m$ $m$, Fig. 1; Fig. 3, a partial section of the structure taken on the line $x$ $y$, Fig. 2; and Fig. 4 is a section of the same on line $w$ $z$, Fig. 3.

In the drawings, the reference-letter A represents the ground or shore which it is desired to protect against the action of the water.

B represents a breast-board, which is inclined upwardly toward the land, preferably from about low-water mark. Said breast-board is preferably constructed of cross-beams $b$ $b'$, which are secured together and cross each other at right angles, so as to form rectangular openings between the beams, and each alternate opening in the vertical and horizontal series is covered by planking or the like, $b^2$, as shown, thus forming openings or pockets $b^3$ in the breast-board, for the purpose hereinafter set forth. The breast-board is supported in its inclined position by close rows of piles, preferably formed of square timber, as shown. The piles C are driven into the ground closely together, forming rows about parallel with the line of the shore, and the rows are preferably located a distance apart equal to the width of the pockets or openings $b^3$, although it is not absolutely necessary to place them this particular distance apart; but the distance can be varied as experience dictates. As shown, the first row of piles extends above the ground a short distance, the next row a greater distance, and so on, so that the breast-board supported upon the same will be held in the inclined position desired, with its lower end on about a level with the low-water mark. The upper portions of the rows of piles are braced and strengthened by the cross-pieces $c$, and said upper portions are provided with openings $d$, Figs. 3 and 4, which are normally closed by the doors or covers E, hinged at their upper edges to the piles or braces to close the openings $d$, and the piles at the lower edges of the openings are notched or beveled, so that the doors can only open outwardly toward the water.

Along the surface of the ground or shore beneath the breast-board is preferably constructed the planking or flooring, $e$, Fig. 2, which is secured to the piles $e'$, driven into the ground between the piles C, and to the beams $d'$, secured to the piles C, and the tops of the piles $e'$ are preferably capped by square timbers, as shown. It will be observed that the planking or flooring will fully protect the shore beneath the breast-board against the water pouring through the pockets, although I prefer to use the planking beneath the breast-board. It is evident that the protector will work equally as well without the planking.

It will be readily seen from the drawings and the foregoing description that the waves will strike upon the breast-board, and their force will thus be broken and the water will pour through the openings or pockets in the same into the chambers or reservoirs beneath the same formed by the rows of piles, and from the chambers the water flows back to the main body through the openings $d$. By forcing open the hinged doors the shore is thus prevented from washing out.

It is clearly evident that numerous slight changes might be made in the form and arrangement of the parts described without departing from the spirit and scope of my invention; hence I do not wish to limit myself to the precise construction herein set forth, but consider myself entitled to all such changes.

Having thus fully described my invention, what I claim, and desire to secure by Letters Patent of the United States, is—

1. The herein-described shore-protector, consisting in the combination, with a breast-board inclined upwardly and landwardly from the water and provided with openings or pockets extending through the same and arranged as described, of piles formed in close rows substantially parallel with the line of the shore and adapted to support the breast-board in its inclined position, said rows being so arranged as to form parallel compartments beneath each longitudinal series of openings or pockets through the breast-board, as set forth.

2. The herein-described shore-protector, consisting of a breast-board provided with pockets or openings and inclined upwardly and rearwardly from the water, and piles to support said breast-board, said piles being formed in rows and provided with openings normally closed by doors, as described.

3. The combination, in a shore-protector, of a breast-board provided with pockets or openings and inclined upwardly and rearwardly from the water, and a series of piles formed in close rows and supporting said breast-board, and provided with openings and doors hinged to normally close said openings and adapted to swing outwardly, substantially as described.

4. The combination, in a shore-protector, with a breast-board provided with pockets and piles to support the same, of planking or flooring above the ground or shore beneath the breast-board, substantially as described.

In testimony that I claim the foregoing as my own I affix my signature in presence of two witnesses.

THOMAS O'CONNELL.

Witnesses:
HUBERT E. PECK,
CHAS. M. WERLE.